A. F. LOCHNER.
ATTACHMENT FOR COOKING UTENSILS.
APPLICATION FILED FEB. 15, 1919.

1,326,942. Patented Jan. 6, 1920.

Inventor
A.F.Lochner
By C.A.Snow & Co.
Attorneys

UNITED STATES PATENT OFFICE.

ADAM F. LOCHNER, OF CHANDLER, OKLAHOMA.

ATTACHMENT FOR COOKING UTENSILS.

1,326,942.  Specification of Letters Patent.  Patented Jan. 6, 1920.

Application filed February 15, 1919. Serial No. 277,209.

*To all whom it may concern:*

Be it known that I, ADAM F. LOCHNER, a citizen of the United States, residing at Chandler, in the county of Lincoln and State of Oklahoma, have invented a new and useful Attachment for Cooking Utensils, of which the following is a specification.

This invention relates to an attachment for cooking utensils, one of its objects being to provide a false bottom which will support the solid contents of a cooking utensil off of the bottom of the utensil and prevent burning.

Another object of the invention is to provide a device of this character which can be adjusted readily to fit utensils of different sizes.

Another object is to provide a structure which is cheaply manufactured and simple in construction and is easily placed in and removed from position.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

Figure 1:
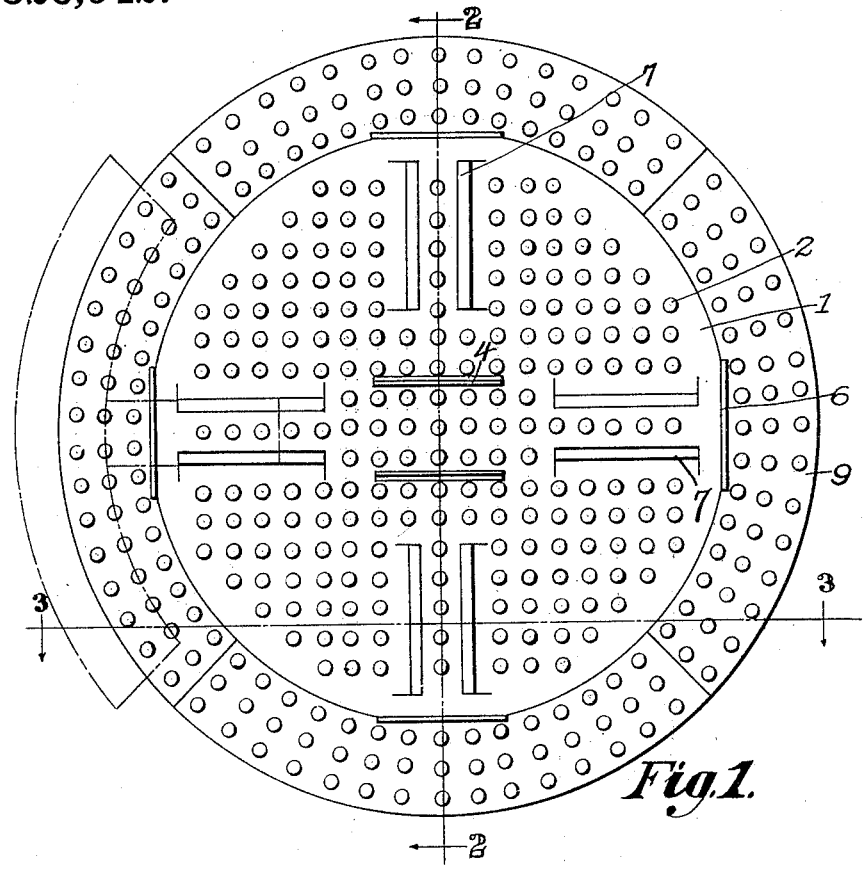
Figure 1 is a bottom plan view.
Figure 2:
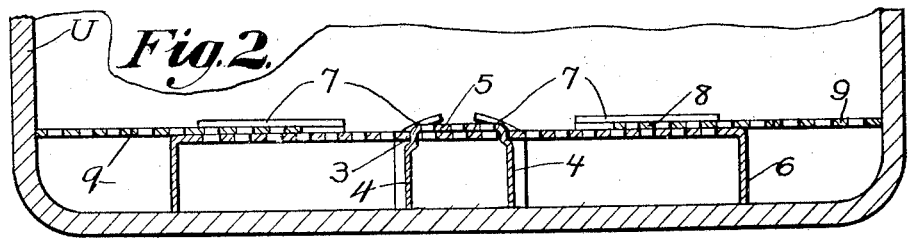
Fig. 2 is a section on line 2—2 Fig. 1.
Figure 3:
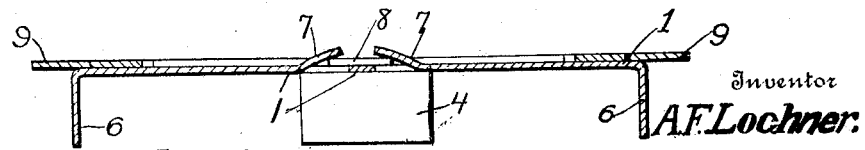
Fig. 3 is a section on line 3—3 Fig 1.

Referring to the figures by characters of reference 1 designates a circular plate provided with a plurality of perforations 2. Parallel slots 3 are formed in the plate near the center thereof and through the slots are extended the parallel end portions 4 of a metal strip 5. The intermediate portion of this strip extends over the middle portion of the plate while the end portions 4 project downwardly and constitute central supports. The portions 4 are prevented from thrusting upwardly within the slot 3 because they are extended slightly under the walls of the slots as shown. Extending downwardly from the margin of the plate 1 at regular intervals are additional supports 6 which are preferably integral with the plate. Formed on the plate 1 at regular intervals are pairs of parallel guide flanges 7 struck upwardly from the plate and converging upwardly, these flanges being disposed approximately radially and constituting guides for tongues 8. Each tongue extends inwardly from the central portion of an arcuate extension plate 9 which is formed with perforations as shown and is adapted to extend over the plate 1 in any desired position, and radially beyond the margin of the plate.

Where the device is used with a small utensil, the extension plates 9 are removed by withdrawing the tongues 8 from between the guide flanges 7. This reduces the device to the minimum diameter which is that of the plate. Where the device is to be used with larger utensils, the tongues 8 are inserted between the flanges 7 as shown in Fig. 3 and the arcuate plates 9 are extended radially any desired distance so as to bring them close to the wall of the utensil U.

By placing in a receptacle the device such as herein described, the solid matter in said receptacle will be supported off of the bottom and will not become burned.

What is claimed is:

A device including a perforated plate having an integral marginal support, there being parallel slots in the plate adjacent the center thereof, a strip bearing upon the central portions of the plate and having end portions extending through the slots and constituting central supports for the plate, said end portions engaging the walls of the slots to hold said portions against upward displacement relative to the plate, pairs of guide flanges extending approximately radially upon the plate, said flanges being struck upwardly therefrom and constituting guides, arcuate perforated extension plates and tongues extending inwardly from the central portions of the extension plates, and detachably and slidably engaging the flanges of the respective pairs.

In testimony that I claim the foregoing as my own, I have hereto affixed my signature in the presence of two witnesses.

ADAM F. LOCHNER.

Witnesses:
W. R. CURRY,
H. G. CURRY.